Jan. 19, 1971  C. BRANDON  3,556,647
CONTINUOUS FILM MOVEMENT MOTION PICTURE CAMERA
Filed May 29, 1968  2 Sheets-Sheet 1

INVENTOR
CHESTER BRANDON
BY
ATTORNEY

INVENTOR.
CHESTER BRANDON
BY
ATTORNEY

United States Patent Office 3,556,647
Patented Jan. 19, 1971

3,556,647
CONTINUOUS FILM MOVEMENT MOTION
PICTURE CAMERA
Chester Brandon, Curacao, Netherlands Antilles, assignor to Singer-General Precision, Inc., a corporation of Delaware
Filed May 29, 1968, Ser. No. 732,909
Int. Cl. G03b 41/06
U.S. Cl. 352—107                                1 Claim

ABSTRACT OF THE DISCLOSURE

A motion picture camera employing continuously moving film. A twisted annular mirror, mounted on the face of a disc, is rotated in synchronism with the film movement and oscillates the optical path to present, at the focal plane, a succession of framed images moving across the film gate at the same linear speed as the film. A variable width focal plane aperture is provided at the film gate for varying the exposure of the film. A collimating objective is interposed between the image gate and the reflecting surface and between the reflecting surface and the film gate. One component of the collimating objective is split diametrally along a plane including its axis and the severed faces are blackened to reduce glare.

BACKGROUND OF THE INVENTION

This invention relates to motion picture cameras, and in particular, to motion picture cameras in which the film passes continuously through the film gate, rather than intermittently. More particularly, the invention relates to motion picture cameras having means for impressing frame-by-frame sequential images upon continuously moving film.

It has long been appreciated that it would be desirable in motion picture cameras to have the film run through the camera continuously, rather than intermittently. Such an arrangement would avoid the wear and tear on the film entailed by intermittent film motion, would be quieter in operation, would, in theory, be superior in the illumination of steadiness of the image, and would have other advantages.

Many different constructions have been proposed for continuous film movement in motion picture cameras. The patent to Hoorn, No. 2,073,637, granted Mar. 16, 1937, suggests one possible way of accomplishing this by means of a helicoidal roof mirror reflecting system, disposed at the periphery of a disc rotating in synchronism with the film.

The principal difficulty, in previous attempts at such cameras, has been to obtain satisfactory means for causing each individual image frame to traverse the film gate in synchronism with the movement of the film through the gate and then, without appreciable pause, to repeat the process with the next frame in the sequence. The previous attempts have been complex and have been beset by mechanical problems and by optical difficulties, such as rectification of the image so that it undistorted and all portions of it equally sharp and uniformly illuminated.

SUMMARY OF THE INVENTION

In the applicant's construction, the difficulties with the prior art constructions have been solved by an arrangement in which each successive image of the motion picture sequence, moving at the same linear speed as the film, is presented at the film gate through the action of an interrupted, twisted, annular mirror rotating in synchronism with the movement of the film. In effect, the optical path, from the obejctive to the film gate, is oscillated by the synchronized mirror, which provides follow-and-return presentation of a succession of moving frames, with substantially instantaneous fly-back from one frame to the next, so that each image appears stationary relative to the film while traversing the film gate. The construction of the motion-compensating mirror is such that its manufacture is simple and relatively inexpensive, in contrast to the complicated and costly film motion-compensating arrangements of the prior art. In the camera of the applicant's invention, a collimating objective is provided which performs the dual function of presenting that image at the film gate, moving across the gate in synchronism with the movement of the film. A correcting prism is provided to compensate for the incremental twist of the mirror surface from side to side of the reflecting field, and a variable focal plane aperture is provided at the film gate.

Accordingly, it is an object of the invention to provide a continuous film movement motion picture camera, having a simple and highly corrected system for compensating for the continuous motion of the film through the film gate.

It is a further object of the invention to provide, in a continuous motion picture camera, novel means for correcting aberration in the film motion compensating device.

It is another object of the invention to provide a continuous film movement motion picture camera that is optically and mechanically simple, easy to construct, and capable of the highest optical and mechanical performance.

Another object of the invention is to provide a continuous film movement motion picture camera having means at the focal plane for varying the exposure of the film.

These and other objects of the invention will be apparent to those skilled in the art, as the description proceeds, and from the drawings.

DESCRIPTION OF A PREFERRED EMBODIMENT

Figure 1:
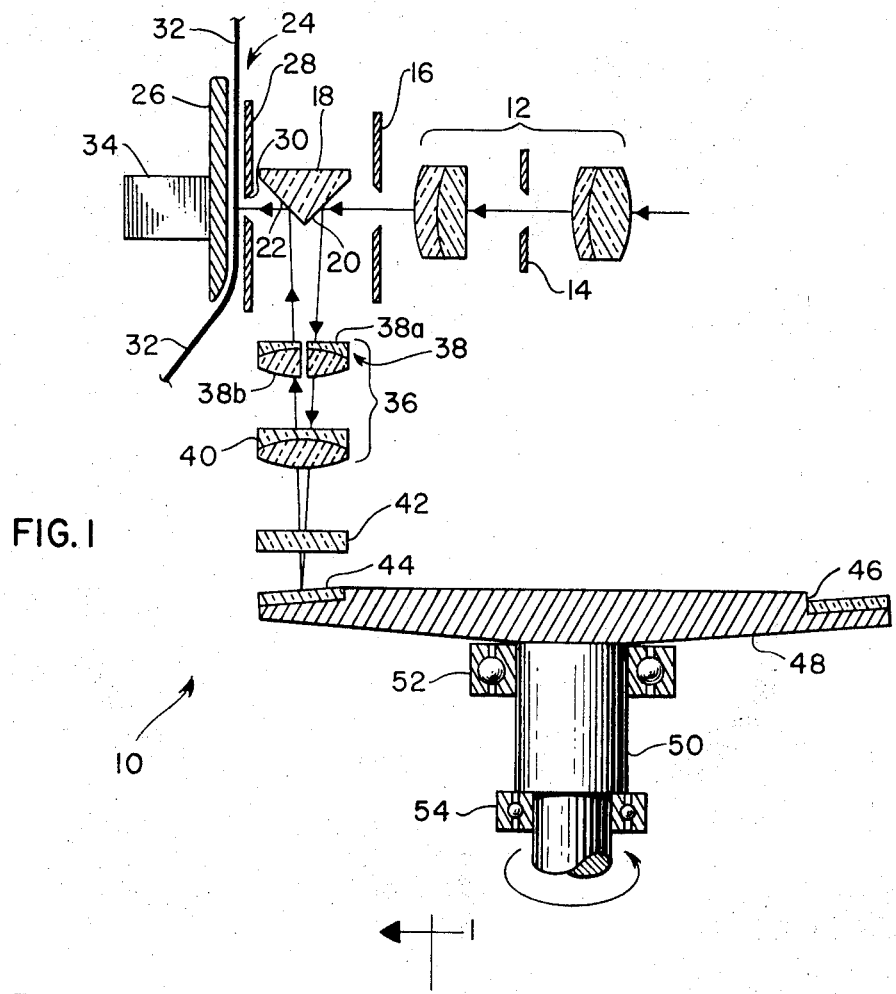
FIG. 1 shows, diagrammatically, a continuous film movement motion picture camera, according to the invention.

In FIG. 1 there is shown schematically a camera 10, according to the invention, having an objective 12 provided with the usual adjustable iris 14. Behind the iris 14 is positioned an image gate 16, one film frame in size and shiftable transversely of the optical axis, for adjusting the framing of the image.

In back of the image gate 16 is positioned a reflecting prism 18 having a reflecting front face 20 and a reflecting back face 22. To the rear of the reflecting prism 18 is positioned a film gate, generally indicated at 24, consisting of a platen 26 and a focal plane aperture plate 28, having a variable width slit 30 extending from side to side of the film 32. The film 32, moving continuously rather than intermittently, passes through the film gate 24, between the platen 26 and the aperture plate 28. A suitable sound head 34 is disposed adjacent to the pressure plate 26, for recording sound on the film in a manner well known in the art.

Below the prism 18, there is positioned a collimating objective 36 having an upper component 38 and a lower component 40. The upper component 38 is split diametrally into a front half-component 38a and a rear half-component 38b. Beneath the collimating objective 36 are a correcting prism 42 and an annular "scanning" or "motion-compensating" mirror 44. Light entering the camera 10 through the objective 12, strikes the prism face 20 and is reflected downwardly through the front half-component 38a and lower component 40 of the collimating objective 36 and passes through the correcting prism 42. The light is then reflected back through the correcting prism 42, lower component 40 and rear half-component 38b of the collimator, to the prism face 22, which reflects it to the film gate 24.

The compensating mirror 44 is seated on an annular ledge 46 in the face of a disc 48, at its periphery. The disc 48 is mounted upon a drive shaft 50, supported in bearings 52 and 54, and is rotated in synchronism with the movement of the film 32 through the gate 24.

Figure 2:
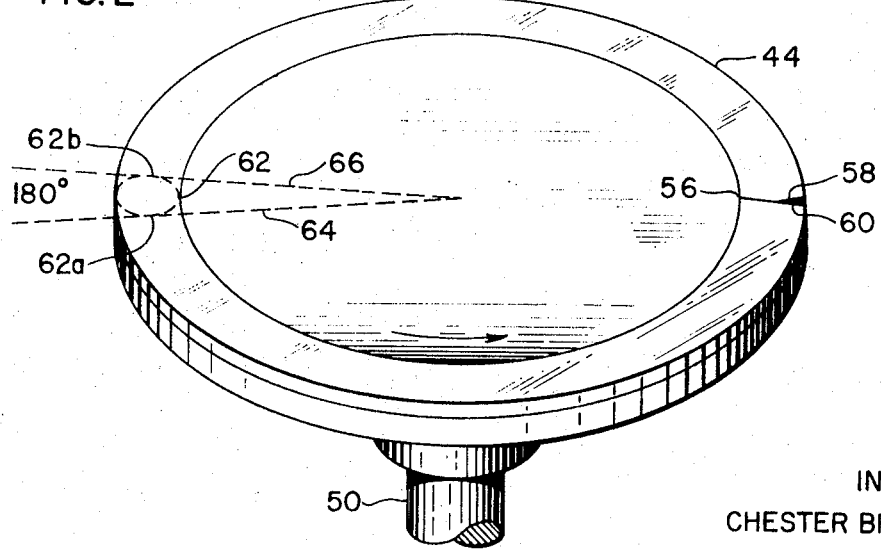
FIG. 2 is a perspective view of a scanning mirror, according to the invention.
Figure 3:
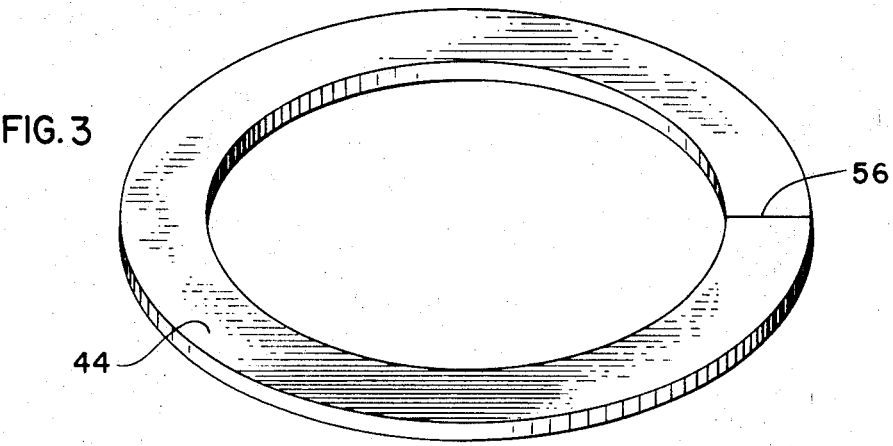
FIG. 3 shows a scanning mirror annulus cut from sheet stock, before severing and twisting.
Figure 4:
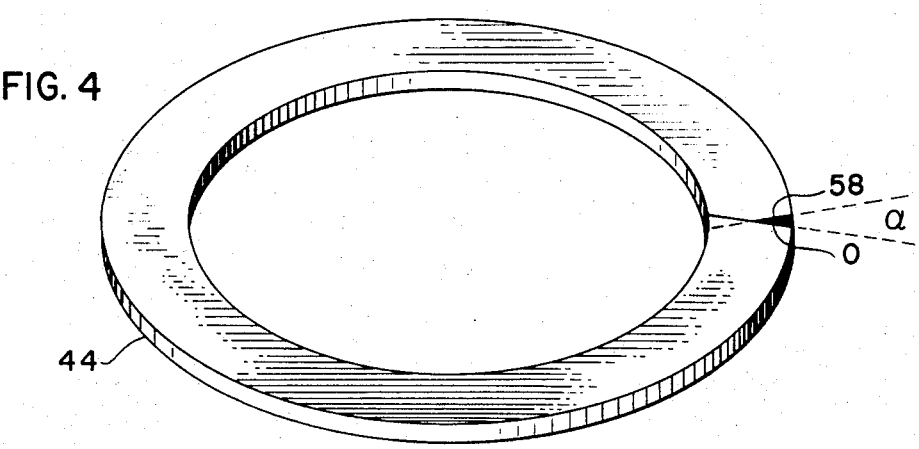
FIG. 4 shows, somewhat exaggeratedly for purposes of illustration, the manner in which the mirror annulus is twisted.

In the exemplification illustrated, the compensating mirror 44, as shown in FIGS. 2, 3, and 4, is in the form of an annulus, severed at one point 56, with one severed end 58 twisted with respect to the other severed end 60, the twist or angle of inclination of the reflecting surface being uniform, from one severed end around to the other severed end. Thus, the inclination of the mirror 44, at the end 58, as seen in FIG. 2, is a maximum in one direction at the point of severance, is planar at 180° about the annulus, and is a maximum in the opposite direction at the other severed end 60, 360° about the annulus. The ledge 46 of the disc 48, upon which the mirror 44 is seated, is an identically interrupted and twisted surface. In FIG. 1, a cross section is shown of the compensating mirror 44 and disc 48, taken along the line 1—1 of FIG. 2.

In the operation of the camera, the rotating compensating mirror 44 acts as a tilting mirror and serves to swing the optical path in synchronism with the movement of the film 32 through the film gate 24. The framed image is thus caused to "track" the film, from the beginning of its registration on the film through the slit 30, until the trailing edge of the framed image has left the slit 30. Simultaneously with the entry of the next image frame, the mirror interruption reaches the edge of the field, the reflecting angle of the mirror instantaneously reverses, and the next image frame is presented at the slit 30, moving in synchronism with the film. The reflecting angle of the mirror thus changes in synchronism with the movement of the film, reflecting a moving image of each frame to the slit 30 for registration in frame-by-frame intermittent sequence.

Referring to FIGS. 3 and 4, the mirror 44, which may be either a front or back surface mirror, is best made from high quality plate glass stock, cut in the form of an annulus, as shown in FIG. 3, with the edges ground smooth and slightly chamfered or rounded. At the point 56, the annulus is severed radially and the ends 58 and 60 twisted in opposite directions through the desired angle $\alpha$, as shown in FIG. 4, in which the angle $\alpha$ is exaggerated for purposes of illustration. Since the plate glass is of very uniform thickness and very perfectly elastic, if the annulus is accurately made, the angle of inclination of the mirror will change uniformly about the annulus, and will be zero, or planar, at a point 180° from the ends.

One satisfactory method of forming and holding the desired twist is to press the severed and planar mirror annulus against disc 48, die cast with the ledge 46 having the desired twist and interruption to match the final shape of the mirror, and to cement the annulus in place on the ledge. Affixing and contouring the annular mirror in this way is quite practical, there being many adhesives well known in the art and suitable for this purpose. However, the mirror can be held in a pronged setting, or by means of a spun rim, or in other ways. The twist of the annulus is not great, the angle which the two ends 58 and 60 make with each other being of the order of two degrees only, for an annular mirror of the order of four or five inches in diameter, turning at 960 r.p.m., in an eight millimeter camera running at 16 frames per second. A small twist, such as this is well within the elastic limit of the mirror glass and can readily be held with epoxy cements.

For a given film size, the twist of the mirror is determined by the focal length of the collimating objective 36. In the case of the 8 millimeter camera described, a suitable collimator focal length is two inches, making the angle of oscillation of the optical path about four degrees in order to cause an 8 millimeter framed image to move across the film gate 24 in sychronism with the film 32 passing in continuous motion at a linear speed equivalent to 16 frames per second.

The collimating objective 36 is preferably telecentric and autocollimating. Its upper component 38 is split diametrally, along a plane including the axis, into two half-components 38a and 38b, which are then separated and blackened along the severed faces, in order to reduce retrodirected glare. The principal function of the collimating objective is to present the image from the image gate 16 at about unity magnification at the compensating mirror 44, then to reproject the image from the compensating mirror to the film gate 24 by reflection from the prism face 22.

Figures 5A, 5B:
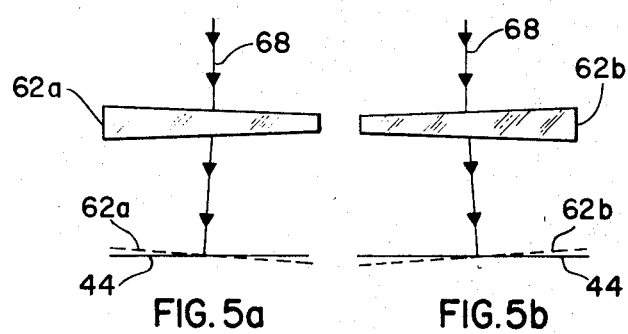
FIGS. 5a and 5b show the manner in which the correcting prism corrects for aberrations of the mirror.

Since the twist of the compensating mirror 44 progresses uniformly about the annulus, the mirror surface progressively changes in angle from side to side of its image field 62 (FIG. 2). This is shown diagramatically in FIGS. 5a and 5b, in which the solid line 44 represents the compensating mirror surface at the 180° point (FIG. 2), at which point the radial element of the mirror surface is planar. In FIG. 5a, the inclination of the mirror at the leading edge of the field, along the radius 64 (FIG. 2), is shown by the dotted line 62a, while the inclination at the trailing edge of the mirror field, along the radius 66 (FIG. 2), is shown in FIG. 5b by the dotted line 62b. In both FIGS. 5a and 5b, the inclination of the mirror surface is greatly exaggerated for purposes of illustration, the actual difference in inclination of the mirror surface from the leading edge of the field to the trailing edge being only four minutes of angle, for a mirror like that shown, having a single radial interruption.

In order to correct for this difference in inclination of the reflecting surface from side to side of the field 62, the correcting prism 42 is employed. In FIG. 5a, the general wedge shape of the correcting prism 42 for the leading edge 62a of the field 62 is schematically indicated at 42a, and in FIG. 5b its general shape for the trailing edge 62b is a similar wedge, reversed, and is indicated at 42b. It will be observed that in both FIGS. 5a and 5b, the respective prism shape 42a and 42b functions to bend the incident beam 68 to normality with the reflecting surface of the mirror 30, in planes tangent to the annulus and parallel to its axis. A similar correction is applied to the reflected beam passing back through the correcting prism 42 toward the film gate 24.

Figure 6:
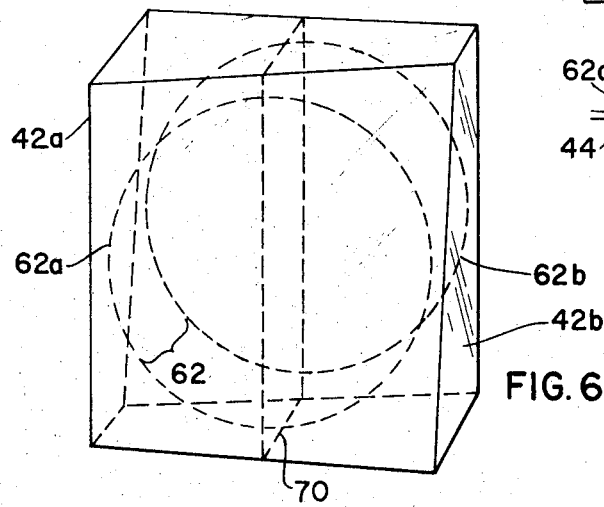
FIG. 6 shows, schematically, in perspective, the general configuration of the correcting prism.

In FIG. 6, the general configuration of the correcting prism 42 is schematically shown in perspective, and the field of view 62 is indicated by the dotted cylinder. One side 42a at the leading edge 62a of the field of view 62, is generally wedge-shaped, as indicated in FIG. 5a. The other side 42b is of similar but reversed wedge-shape, as indicated in FIG. 5b, and the body of the prism between the sides gradually blends from one wedge-shape to the other. Along a radial plane at the middle of the field 62, the correction to be applied by the prism is zero, and, therefore, the prism is of uniform thickness at its mid-section 70, as indicated by the dotted rectangle. The actual departure of the prism 42 from plane-parallelism is not great, since, as previously mentioned, the change in inclination of the compensating mirror 44 from side to side of the field 62 is only about four minutes of angle in the exemplification illustrated. The schematic showing of FIG. 6 is, therefore, an exaggerated one for purposes of illustration.

In the usual focal plane camera concept, the image is fixed in relation to the film. In cameras having a focal plane shutter, the shutter moves across the image frame or gate, and the exposure time is determined by the transit time for the slit to move through a distance equal to its width, and not the total time required for the slit to traverse the entire image frame.

The advantages of focal plane shutters, in permitting very short exposure times for successive increments of the image frame, have long been appreciated, but such shutters have not heretofore been practical for motion picture cameras because of the intermittent motion of the film and the consequent complexity of the mechanism required. In the camera construction of the present invention, in which the film moves continuously, rather than intermittently, the focal plane slit 30 is fixed in position and only a simple, non-kinematic adjusting mechanism is needed to vary the width of the slit. The film exposure can thus be controlled in three ways: by regulating the aperture of the iris, which will control the intensity of the light admitted to the camera; by regulating the frame rate, i.e., the linear speed of the film through the film gate; and by regulating the width of the focal plane slit. The term "focal plane," it should be noted, is one common to the art and contemplates not only the flat or planar surface or shape, in which the film is usually held for exposure, but also, loosely speaking, non-planar focal surfaces, cylindrical or acylindrical, as in some anamorphic optical systems known in the art for wide screen motion picture cameras. Thus, the variable focal slit according to the invention is usually planar and closely parallel to the flat film in the film gate, but may be closely concentric to any non-planar focal surface.

Cameras according to the present invention are able to operate at high frame rates, inasmuch as there are no accelerations and decelerations occasioned by an intermittent film pull-down mechanism. Greater sharpness of the image can be achieved, as desired, by reducing the width of the focal plane slit, thereby reducing the exposure time and minimizing the effect of movement of the subject during the exposure of each image frame. Cameras constructed according to the present invention can employ high frame rates with relatively large focal plane slit widths or low frame rates can be used with relatively narrow slit openings, yielding very high resolution images. Cameras according to the invention are inherently quieter, since the continuous film drive is smooth; the frame-to-frame registration of the images is for the same reason.

It will be apparent that the specific camera construction described is merely exemplary of many possible constructions within the ambit of the invention. For example, it is not necessary that the optical path through the camera be folded in the manner shown in FIG. 1 for it would, of course, be entirely feasibly to dispose the axis of the photographic objective perpendicularly to the direction in which it is shown, eliminating the necessity for the reflecting face 20 of the prism 18. Similarly, the plane of the film gate can be disposed perpendicularly to the depicted attitude obviating the need for the reflecting face 22 of the prism 20 which, of course, need not be a prism, but can be a mirror or mirrors. If, instead of the mirror 44 shown, a similar one be employed, but with the annulus interrupted at a plurality of joints equally spaced about the periphery, the rotational speed of the mirror can be reduced by a like factor, the amount of correction applied by the prism 42, for the increased incremental twist across the mirror field, being correspondingly increased.

Other possible constructions according to the invention will suggest themselves to those skilled in the art.

I claim:

1. A motion picture camera for recording a succession of images upon continuously moving film, said camera comprising: a film gate; means for passing film in continuous movement through said film gate; an image gate; an objective lens system for projecting an image through said image gate to said film gate; and motion compensating means interposed in the optical path between said image gate and said film gate for deflecting the image through the film gate at the same linear speed as the film, said motion compensating means including:

a rotatable annular reflecting surface, severed at one point on the periphery and twisted from one severed end to the other, said annular surface being rotatable in synchronism with the movement of said film; and a collimating objective interposed between said image gate and the reflecting surface and between the reflecting surface and the film gate, said collimating objective having a plurality of components, one of which is distal of the reflecting surface and slit along a diametral plane including the optical axis of the collimating objective.

References Cited
UNITED STATES PATENTS

| | | | |
|---|---|---|---|
| 651,691 | 6/1900 | Barr | 352—107 |
| 1,033,608 | 7/1912 | Mukautz | 352—207 |
| 1,401,345 | 12/1921 | Mechau | 352—108 |

JOHN M. HORAN, Primary Examiner

M. H. HAYES, Assistant Examiner